United States Patent [19]

Custer et al.

[11] Patent Number: 4,551,827
[45] Date of Patent: Nov. 5, 1985

[54] FLUORESCENT SOUNDTRACK READOUT SYSTEM

[75] Inventors: Peter A. Custer, 85 Red Hill Rd., Princeton, N.J. 08540; George R. Bird, Princeton, N.J.

[73] Assignee: Peter A. Custer, New York, N.Y.

[21] Appl. No.: 196,032

[22] Filed: Oct. 10, 1980

Related U.S. Application Data

[63] Continuation-in-part of Ser. No. 088471, Oct. 26, 1979, abandoned.

[51] Int. Cl.⁴ .......................... G11B 7/02; G11B 7/04
[52] U.S. Cl. ........................................ 369/101; 352/1
[58] Field of Search ............... 369/54, 58, 59, 100, 369/101, 107–108, 112, 120; 365/120, 106; 352/1

[56] References Cited

U.S. PATENT DOCUMENTS

| | | |
|---|---|---|
| 1,260,337 | 3/1918 | Craig . |
| 1,809,310 | 6/1931 | Owens .................................. 369/120 |
| 2,156,625 | 5/1939 | Flory et al. ........................... 369/120 |
| 2,203,191 | 6/1940 | Dimmick .............................. 369/101 |
| 2,244,733 | 6/1941 | Schwarz . |
| 2,289,054 | 7/1942 | Dimmick .............................. 369/54 |
| 2,314,392 | 3/1943 | Dimmick .............................. 369/54 |
| 2,595,701 | 5/1952 | Potter . |
| 2,678,254 | 5/1954 | Schenck . |
| 3,379,095 | 4/1968 | Kaprelian ....................... 369/101 X |

FOREIGN PATENT DOCUMENTS

| | | | |
|---|---|---|---|
| 360902 | 11/1931 | United Kingdom ................. 369/54 |
| 481461 | 3/1938 | United Kingdom ................. 369/54 |

Primary Examiner—Robert L. Richardson
Attorney, Agent, or Firm—Fidelman, Wolffe & Waldron

[57] ABSTRACT

A fluorescent soundtrack readout system for decoding the digital soundtrack of a motion picture film employing ultraviolet light directed onto the surface of the soundtrack film to cause the digital indicia thereon to emit visible light and for transmitting the emitted visible light to a photodiode array to detect same.

12 Claims, 4 Drawing Figures

FLUORESCENT SOUNDTRACK READOUT SYSTEM

CROSS-REFERENCE TO RELATED APPLICATIONS

This application is a continuation-in-part application of copending application Ser. No. 088,471, entitled "Fluorescent Soundtrack Readout System" of Bird and Custer, filed Oct. 26, 1979, now abandoned, and is related to application Ser. No. 088,465, entitled "Motion Picture Film Having Digitally Coded Soundtrack and Method for Production Thereof" of Custer and Bird, filed Oct. 26, 1979, now U.S. Pat. No. 4,308,327 both of which are incorported herein by reference.

BACKGROUND OF THE INVENTION

The present invention is directed to a motion picture projection system capable of detecting a digital soundtrack coded in fluorescent material on the surface of motion picture film.

As is fully described in copending application entitled "Motion Picture Film Having Digitally Coded Soundtrack and Method for Production Thereof", Ser. No. 088,465, filed Oct. 26, 1979, of Custer and Bird, a motion picture soudtrack may be digitally coded with compounds which are colorless and transparent to visible light and which fluoresce in the visible spectrum when exposed to ultraviolet light. Because these fluorescent compounds will not interfere with the visual images on the film the soundtrack may be imprinted over the visible image portion of the motion picture film.

It is known to use various light systems, e.g., the system shown in U.S. Pat. No. 1,928,329 to Oswald, et al. and U.S. Pat. Nos. 3,508,015 and 3,522,388 to Miller. However, these systems apparently do not recognize the possiblity of recording both sound and images on the same area of the film. The patent to Oswald, et al. uses black and white film and visible light through a lens to provide the sound system while the patents to Miller utilize light emitting diodes of varying types. The systems thus suffer from the same deficiency of good sound reproduction as is encountered in the magnetic strip or variable area analog optical type of motion picture sound recording.

U.S. Pat. No. 2,244,733 to Schwarz discloses a sound recording apparatus utilizing ultraviolet light to image a film. Ultraviolet light reflected from the surface of the film is directed to a fluorescent screen to visually monitor the modulation of the mirror galvanometer during the recording operation. In an alternate embodiment, the surface of the film may be uniformly coated with a fluorescent material for the purpose of focusing or checking the modulation on the film (column 2, lines 19–28).

U.S. Pat. No. 2,678,254 to Schneck discusses digital coding and photodiode arrays generally.

Further, the art sometimes accomplishes multiple sound source effects by using separate, but synchronously run, film strips or magnetic tapes. These systems present serious technical problems such as maintaining sound and image synchronization between the two separately run systems, especially when the strip or tape of one of the two systems has a section removed because of repair or for other reasons. This film may be of the standard 16 mm, 35 mm or 70 mm size. In the present invention and use, a plurality of digital soundtracks imaged in a transparent, substantially colorless material which can be excited to fluorescence by ultraviolet light are superimposed over the actual image area. One ultraviolet soundtrack exciter source serves to energize, or cause to fluoresce, all of the soundtracks.

Because of the limited quality of optical and magnetic analog soundtracks in standard use the motion picture industry has been unable to effectively reproduce the detailed realism, presence and aural excitement achieved with high fidelity systems at home and at discotheques and concerts. The accuracy of sound reproduction accepted as standard on records and tapes cannot physically be contained in the analog optical track standardized 50 years ago in cramped and grainy space alongside Edison's inch-wide picture. Within this decade, given digital recording, the art of high fidelity sound reproduction will improve still further, putting the film industry in worse jeopardy of failing to provide sound of equal fidelity.

Digital coding enables complete digital sound handling, including mixing and editing, usually done on magnetic tapes, without tape hiss or noise or degradation of the sound signal accumulating through successive generations of re-recording. With the sound signal reduced to plus/minus ("yes"/"no") bits and with parity check bits to monitor the entry of errors, the identity of successive reproductions can be assured. Thus, the present invention is further directed to a film having a digitally coded soundtrack(s) which records sound as binary number data and reconstructs it with absolute precision.

The archaic analog soundtrack is a "picture" of the wave nature of sound and the detail of the analog sound information must inevitably be mixed together with the intrinsic defects of the recording medium. The distortion which is characteristic of the analog recording means and the noise imposed by the coarse silver grains of the film become inseparable from the desired high fidelity sound.

The essential difference in the digital sound record is that the integrity of the sound information exists separate and immune from the physical nature of the recording medium. It is the intent of fluorescent soundtracking to record a plurality of channels of digital sound across the photographic image space of film as transparent and colorless fluorescent digital words. In digital sound recording, the amplitude of the sound wave is "sampled", or measured, at discrete intervals at a clocked constant repetition rate, as, for example, 50,000 samples per second to record frequencies of up to 20,000 Hz. Each sample is next converted to, for example, 16 bit digital words with one or more parity check bits. The 16 bits of each word used to record the wave amplitude of the sample (the dynamic range) can write any integer between 0 and 65,535. This is considerably more information than can be derived from the compressed amplitude spike of the present standard optical analog soundtrack record that is submerged among silver grains. Following Nyquist's theorem there must be more than two samples taken for each cycle of the highest frequency to be reproduced. Thus, 50,000 samples/sec. (more than 40,000 samples/sec.) can reproduce 20,000 Hz sound.

OBJECTS OF THE INVENTION

It is an object of the present invention to provide a fluorescent soundtrack readout system for decoding the digital data matrix soundtrack of a motion picture film.

It is an object of this invention to provide an optical system for focusing a beam of ultraviolet light onto the surface of a fluorescent soundtrack film and for collecting the visible light emitted from the film and transmitting it image-wise to a photodiode array to detect same.

Another object of the present invention is to produce one or more data bit streams of discrete sequential current pulses to convey the information of the data matrix to the digital inputs of a digital-to-analog converter.

Additional objects and advantages will become apparent from the following disclosure.

DESCRIPTION OF THE DRAWINGS

The appended drawings illustrate certain exemplary embodiments of the present invention.

DESCRIPTION OF THE PREFERRED EMBODIMENTS

Figure 1:
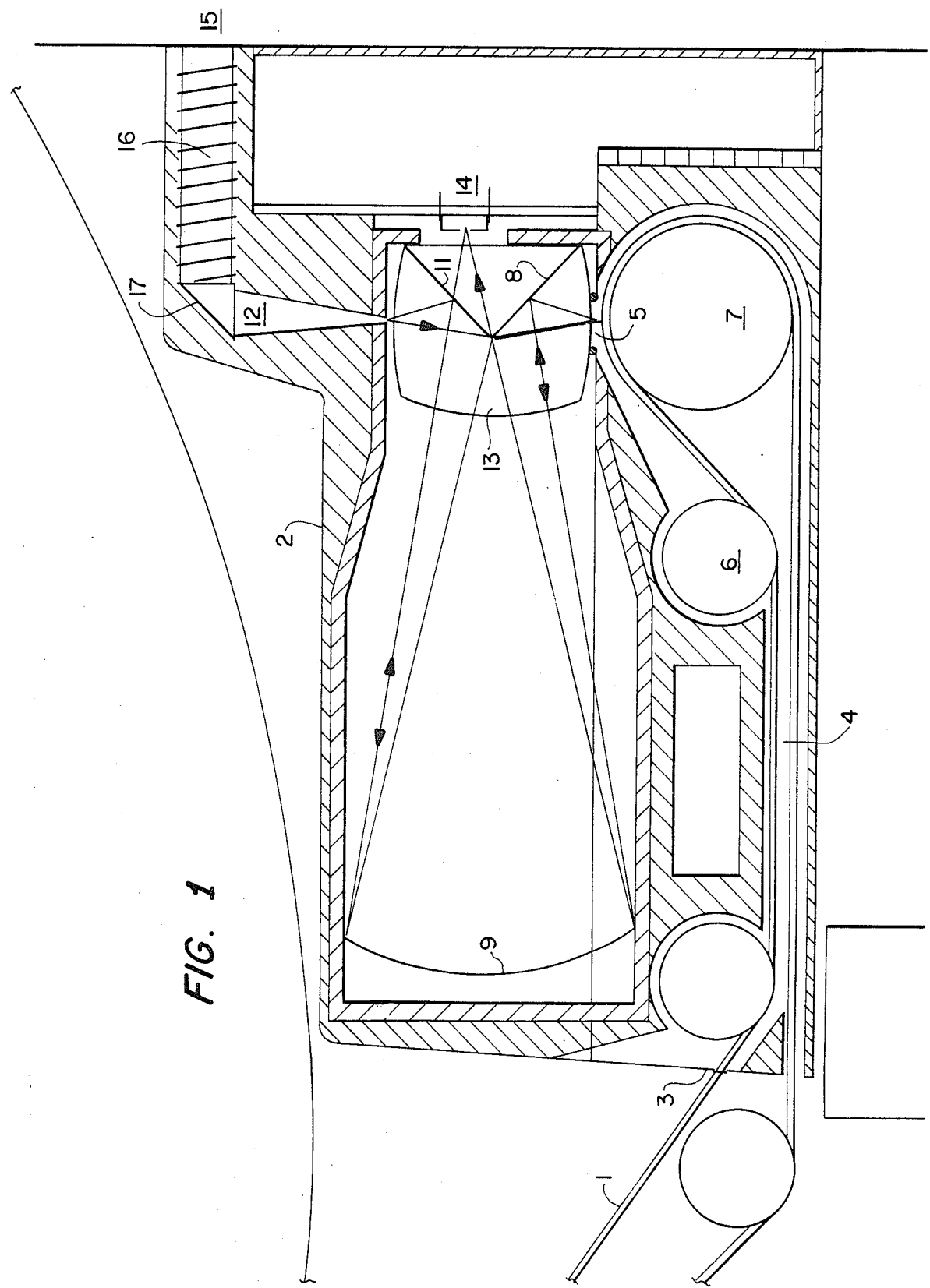
FIG. 1 presents a sectional view of the portion of a motion picture projection system showing one fluorescent soundtrack readout system of the invention.

In FIG. 1 a sectional view of a motion picture projection system having the fluorescent soundtrack readout system of the invention is shown. As noted above, the system functions by exposing the fluorescent soundtrack to ultraviolet light and detecting fluorescence in the visible light spectrum from the compounds representing the soundtrack data matrix. The fluorescence is simultaneous to $3 \times 10^{-9}$ seconds with the irradiation. The film 1 is fed into the read-out stage through slit 3 which allows only minimal light to enter the readout stage. In the embodiment of FIG. 1 the angle of the film path around the sound drum and the fact that outside light is blocked by the film in multiple reflections in the narrow slit path 4 keeps stray light from getting to the readout point 5. The access to the film path can be closed by a light-tight cover after threading the film. Optics and electronics are isolated from the film path and sealed to keep out dust and debris.

The second guide roller 6 internal to the readout system is flanged to secure the lateral film position around the sound drum 7 and is spring-loaded downward to tightly wrap the film against the sound drum surface. The point of focus at readout point 5 is critical while lateral weave is not.

The sound drum 7 is relatively large so that the film plane is relatively flat at readout point 5 and is free-running with a flywheel mass contained inside the projection cabinet. The readout point 5 is the position on the sound drum 7 at which the digital soundtrack image is exposed to ultraviolet light and the visible light representing the data matrix is emitted from the film surface. No physical contact occurs during this purely optical reading operation so problems of abrasion and image degradation are minimal. A beam of ultraviolet light formed by an intense remote source 15 such as a mercury arc or xenon projection lamp is funneled along light pipe 16 comprised of a fluid filled plastic tube, as, for example, the tube disclosed in U.S. Pat. No. 4,045,119, or a fiber optic ultraviolet conducting material. Where a fluid filled tube is used the fluid must be a good ultraviolet light transmitter and not susceptible to ultraviolet light degradation. The ultraviolet light beam is then focused by, for example, a quartz light funnel 12 and projected by means of lens block 13, internal mirror 11, concave mirror 9, and internal mirror 8 onto the film soundtrack at readout point 5.

The circular entrance aperture (not shown) of the light pipe is filled with an image of the light source entering with an angular cone at least as large as the final lens aperture. For example, f: 2.0 corresponds to an angular cone whose angle from the central ray (and cone axis) to the extreme ray has a tangent of $\frac{1}{4}$ or 0.25 in air. This corresponds to 14.04°, or to a smaller angle of 9.31° inside a representative light pipe having an interior refractive index of 1.5 (a value common to many less dense glasses and organic materials). It is important that the entrance aperture be really filled with light, but image quality is no object and moderate aberrations are permitted in the condenser lens (also not shown). Optionally, an ultraviolet light transmitting, visible light rejecting filter may precede the entry to the light pipe. The cross-sectional area of the light pipe entrance must be considerably larger than the area of the output line of funnel 12.

The ultraviolet light is reflected from light pipe 16 to funnel 12 by diagonal reflector 17 preferably made of a polished surface with a multilayer interference reflector on its surface. Below the diagonal reflector 17 the round section opens slowly and smoothly into a very long, thin line of length 25 mm (as wide as the film width between sprocket holes). It is imperative that the surface of the funnel be smooth (either fire-polished or optical polished) so that little ultraviolet light is lost through scattering at surface scratches.

The end of the light funnel is ground to an optical flat surface, and is covered with a slit-mask which leaves open an area roughly 30 micrometers $\times$ 25 mm. This is deliberately made a bit wider than the reading area on the photodiode array (16 micrometers) to allow for any minor imperfections of focus or light non-uniformity, since the goal is primarily to illuminate the film with intense ultraviolet light.

At the narrow air gap between the lens block and the funnel the end surfaces are given an antireflection coat to minimize reflection losses. A single quarter-wavelength coating of $MgF_2$ would suffice (with n=1.38 the reflection loss is reduced below 1% per surface). For the ultraviolet light transmitting portion of the system, the wavelenth of peak action is roughly 360 nm, so the desired coating thickness is 360 nm/(4$\times$1.38)=65.2 nm. The wavelength band of low reflection loss is quite wide, but for bifunctional surfaces, such as 13 and the block surface above 5, which pass both visible and ultraviolet light, it is preferable to use a three layer evaporated antireflection coat. If not, the antireflection peak would be set around 400-420 nm. This value, and especially the desired antireflection peak for the visible transmitting surfaces cannot be fixed exactly until the final brightener chromophore is chosen, since the wavelength distribution of emitted fluorescence will vary from one brightener compound to another.

The lens block 13 is a longer wavelength (>320 nm) ultraviolet and visible light transmitting glass block with cornering reflecting surfaces 8 and 11 internal to the block. Dichroic mirror surface 11 comprises a tuned refelection/antireflection multilayer which reflects ultraviolet light and transmits visible light. The thicknesses of the layers are chosen so as to position the sharp crossover from reflection to transmission at about 410 nm, or to a more appropriate wavelength to be fixed after the final choice of brightener compound. Convex mirror 9 and internal mirror 8 are coated with broad band ultraviolet-visible multilayer light reflecting coats.

The ultraviolet light entering the top of the lens block 13 is reflected by mirror surface 11 to convex mirror 9 and onto mirror surface 8 which in turn projects the beam onto the surface of the film at readout point 5. The visible light fluorescence emitted from the film soundtrack data matrix makes a similar return path through the lens block 15 and off convex mirror 9 until it converges through the dichroic mirror 11. Here the visible radiation continues through and exist the lens block to arrive at a focal plane on the surface of the photodiode array 14. The photodiode array is fabricated with a limiting slit of width 16 micrometers over the light sensitive elements.

Figure 4:
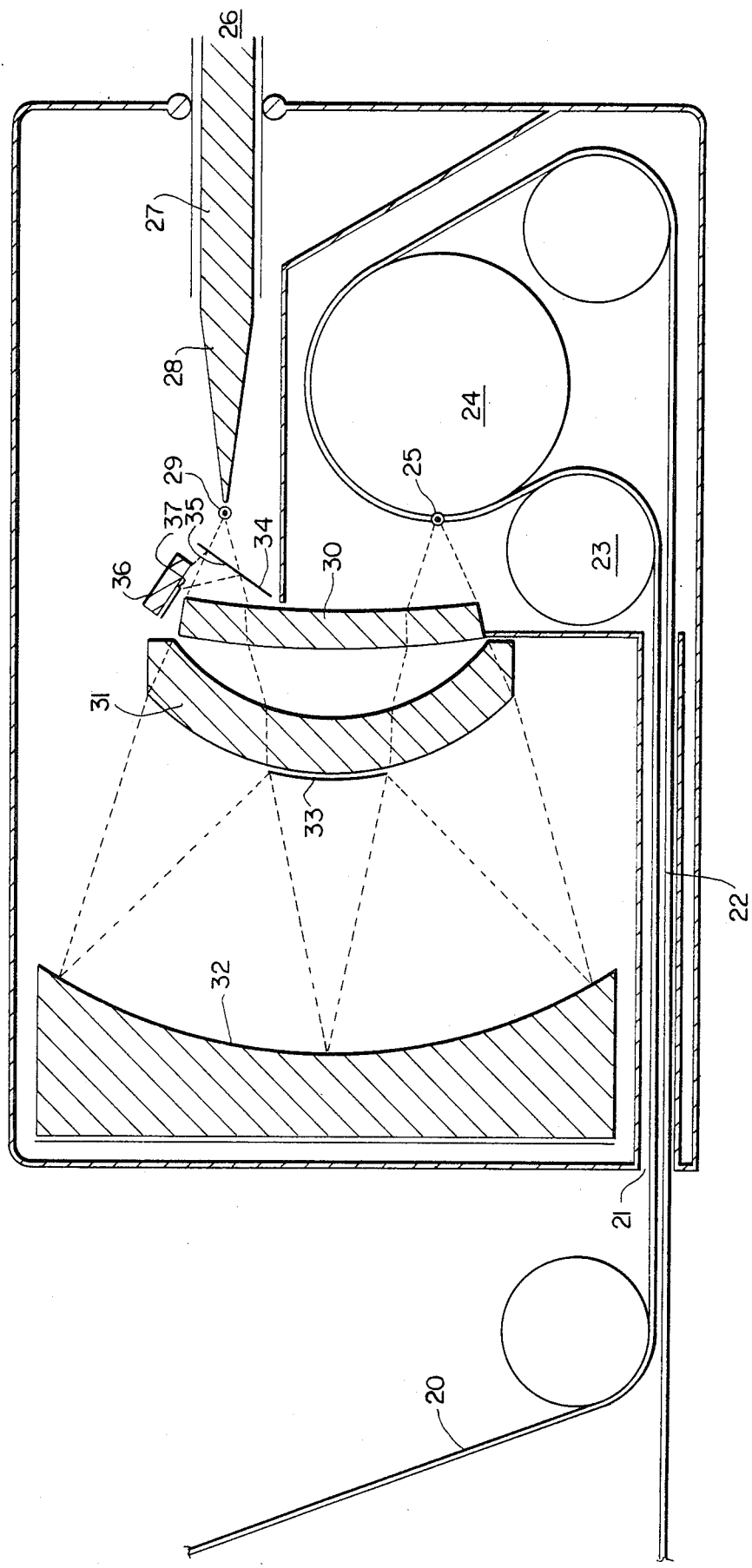
FIG. 4 presents a sectional view of the portion of a motion picture projection system showing another fluorescent soundtrack readout system of the invention.

FIG. 4 presents a sectional view of a motion picture projection system having another fluorescent soundtrack readout system of the invention.

The film feeding and handling parts of the system are essentially the same as in the embodiment of FIG. 1. The film 20 is fed into the soundtrack readout stage through a slit 21 and then through a narrow film path 22. As above, the system is designed to be light-tight and dust free. The first guide roller 23 within the readout stage is flanged to adjust the lateral film position and is spring-loaded to apply tension to the film to keep it tightly wrapped around the sound drum 24. Readout point 25 is relatively flat owing to the relatively large diameter of sound drum 24. The readout point 25 is the position on the film which is exposed to ultraviolet light, causing fluorescence of the digital soundtrack images printed thereon.

The ultraviolet light enters from an intense remote source 26 and is funneled along light pipe 27 and focused by, for example, a quartz light funnel 28 at focal point 29. The light pipe and quartz light funnel may be of conventional design as discussed in the description of FIG. 1.

Briefly, the ultraviolet light beam is projected from focal point 29 by means of correcting lens 30, central lens 31, concave mirror 32 and convex mirror 33 onto the readout point 25. Note that 33 is a central, reflectively coated section of the surface of lens 31.

In greater detail, an ultraviolet light ray from focal point 29 passes through the flat glass body of the dichroic beam splitter 34 and continues with very little deflection through correcting lens 30 to correct chromatic and other aberrations. The ray then passes through central lens 31 which deflects the ray upward and onto the surface of concave mirror 32 from which it is reflected downward onto convex mirror 33 and then back to concave mirror 32. From concave mirror 32 it is reflected back through central lens 31 and correcting lens 30 and finally onto readout point 25.

The visible light emitted by the fluorescent images on the film at readout point 25 retrace a similar path through the mirror/lens system until it reaches the dichroic beam splitter 34. At this point, visible light reflected from the second reflection from concave mirror 32 toward focal point 29 first meets the multilayer dichroic reflector 35 (of the dichroic beam splitter 34), and never enters the body of the dichroic element. It is necessary that visible light not pass through a tilted, planar element (the body of the dichroic element) as this would introduce serious image aberrations. The visible light is refected from the dichroic reflector 35 ultimately to the photodiode array 36. Design considerations may require an intermediate reflection, as depicted in FIG. 4 at diagonal mirror surface 37. From surface 37 the converging rays are incident normal to the surface of the detector.

It is possible though not particularly practical to direct the ultraviolet light from the remote source via a light pipe and through a light funnel directly onto the readout point (5 or 25) without the above-described mirror/lens system. Alternatively, the ultraviolet light could be directed to the readout point by a single focusing lens, although this would be dimensionally awkward and not a preferred embodiment.

In the above-described embodiments the overall purpose is to flood a line image of length roughly 24 millimeters and width roughly 30 micrometers on the film ultraviolet exciting light. The ultraviolet-excited visible fluorescence generate a signal output on a matching 1:1 line at the detector. Since both exciting and collecting require a large angular cone, the lens is advantageously and preferably bifunctional, imaging ultraviolet and collecting visible light in the same, maximal cone.

The line scanning photodiode array is mounted on a circuit board that contains those electronic functions that must be in close proximity to the array. The data bit stream from the arrays and circuit boards on each of several projectors is fed to a single master computer that thus suffices for all of the projectors in the projector booth. This master computer has data error sensing and correcting, digital-to-analog converters, and six channel amplifier electronics. Exemplary of the photodiode array suitable for use in the present invention is the Reticon FL-1728H or RL-1024H, two high resolution solid state image sensors designed for facsimile and related applications (available from Reticon Corporation, Sunnyvale, Calif.). These silicon integrated circuits contain a row of 1728 or 1024 photodiodes on 15 micrometer centers, together with shift register scanning circuits for sequential output.

Figure 2:
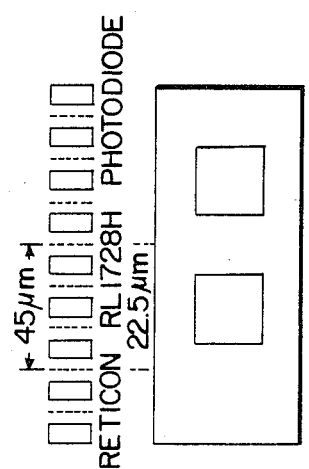
FIG. 2 illustrates a partial lateral section of a film having the soundtrack of the invention.

It is assumed that the film will weave slowly from side to side by at least 0.005 cm. Thus, it is not possible to allocate a particular detector element of the array to a particular bit. Instead, two or three detector elements are allowed for the full width of each bit and the location of the bit in time and space is determined relative to a reference position line on the film (see FIG. 2). Since the optical system functions at a 1:1 magnification, this provides for a bit width of 30 or 45 micrometers (three detector elements). To minimize the demands on image resolution, it is highly desirable that the bits be roughly square. A sampling rate of 50,000 words per second requires for simple linear reading for a string of laterally written words a bit length of (43.2 cm/sec.)/50,000 bits giving an undesirably compressed bit-length of 8.64 micrometers. Accordingly, we read instead four words across the width of the film in a single track, giving a real-time sampling repetition of clusters of four words at a rate of 12,500/sec. and a bit length of 36.5 micrometers at the conventional 35 mm film speed of 43.2 cm/sec.

Beside the soundtrack is a steady string of dark and fluorescent bars which serve to inform the computer of positions in time and space (weave) of the digital words. This timing ladder must be wider than the maximum allowable film weave, and is preferably read by a separate photodiodes which operate continuously, and thus are not a part of the repeating circuit of the detector photodiode array. These separate photodiodes are located on the same silicon chip as the detector photodiode array but have direct external connections independent of the detector array.

A unique feature of the Reticon detector array is that the elements are always active. A circuit internal to the chip charges the individual elements in rapid succession, and the next reading is obtained from the current required to recharge each element in its turn. On the other hand, it is desired that the individual elements be inactive during the time the boundaries between successive words are passing over the detector elements. This is accomplished by having a "dummy scan" of the detector alternate with each reading scan. This dummy scan is simply not entered into the computer circuits. Thus the actual scan repetition rate is 25,000 scans/second, with alternate scans being rejected. Further, the rate of reading the scanning pulse passing down the string of detector elements would be too high if the entire six channel (24 word) lateral array were to be scanned by a single pass over a single detector string having more than 1512 elements. Instead, the single silicon wafer is to contain six separate scanning strings of more than 252 elements each to be scanned in parallel time and to deliver outputs on six parallel lines to the computer.

Figure 3:
FIG. 3 illustrates the relationship between the photodiode detector array and several digital indicia.

To provide six channels of digital sound data on a motion picture film, it is desirable to divide the film longitudinally into six channel columns. Each channel column is the width of four words of sixteen bits each. One such channel column is shown fully in FIG. 3. The timing ladder described above is shown as a uniformly repeating series of rectangles near the left edge of the film.

While the Reticon detector array and the description above are preferable embodiments, it is to be understood that other geometric arrays and logical arrangements of data are contemplated as well.

In an alternate embodiment of the invention, the silicon detector array may be replaced by another image detector, such as a conventional television camera tube, a vidicon, for example.

The computer circuity involved in decoding the digital data bit streams presented herein forms no part of the present invention.

To complete the isolation of the visual projection system from the fluorescence of the soundtrack image an auxiliary ultraviolet absorbing filter may be inserted at any point prior to the film. This will prevent any excitation of the brightener while the visible image is being projected and viewed.

The above descriptions of the preferred embodiments are not to be construed as limiting the scope of the present invention which is more rigorously defined by the appended claims:

What is claimed is:

1. A fluorescent soundtrack readout system, comprising:
 a. a source of ultraviolet light,
 b. a means for directing the ultraviolet light onto the surface of a digitally coded fluorescent soundtrack film to cause the fluorescent soundtrack data matrix to emit visible light, and
 c. a means for transmitting the emitted visible light image-wise to a photodiode array to detect the visible light,
 wherein the means for directing the ultraviolet light and the means for transmitting the visible light comprise at least one mirror and at least one common lens, wherein the means for directing the ultraviolet light and for transmitting the emitted visible light comprise an ultraviolet light reflecting, visible light transmitting dichroic mirror and two ultraviolet and visible light reflecting mirrors, wherein the ultraviolet light is first directed onto the dichroic mirror from which it is then directed onto a first totally reflecting concave mirror and then to a second totally reflecting mirror from which it is directed onto the fluorescent soundtrack, and wherein the emitted visible light is directed onto the second total reflecting mirror to the first totally reflecting concave mirror and then transmitted through the dichroic mirror to the photodiode array.

2. The readout system of claim 1, wherein the dichroic mirror and the second totally reflecting mirror are contained within an ultraviolet and visible transmitting lens.

3. A fluorescent soundtrack readout system comprising:
 (a) a film having thereon a plurality of digitally coded soundtracks comprising soundtrack images imprinted with a fluorescent material which is transparent in visible light and which emits visible light when exposed to ultraviolet light;
 (b) an ultraviolet light beam source to provide a beam of ultraviolet light;
 (c) means for moving the film past the beam of ultraviolet light;
 (d) means for directing said beam of ultraviolet light onto said soundtrack images whereby they fluoresce;
 said means comprising:
  1. a dichroic beam splitting mirror adapted to split a light beam into ultraviolet and visible light;
  2. means for directing said ultraviolet light beam onto said dichroic mirror;
  3. at least one lens for directing the ultraviolet light beam to at least one ultraviolet and visible light reflecting mirror and thence to the soundtrack images;
  4. at least one reflecting mirror adapted to transmit the emitted visible light from the soundtrack images to said dichroic mirror;
 (e) an image detector to detect the said emitted visible light leaving the dichroic mirror; and
 (f) means for enclosing said readout system to provide a substantially dark environment except for said beam of ultraviolet light and said emitted visible light.

4. The readout system of claim 3, wherein the dichroic mirror is a visible light reflecting, ultraviolet light transmitting dichroic mirror.

5. The readout system of claim 3, wherein the dichroic mirror is an ultraviolet light reflecting, visible light transmitting dichroic mirror.

6. The readout system of claim 3, wherein the means for directing said beam of ultraviolet light comprises a light funnel.

7. The readout system of claim 6, wherein the means for directing said beam of ultraviolet light further comprises a transmitting lens.

8. The readout system of claim 3, wherein said image detector is a photodiode array.

9. The readout system of claim 3, wherein said image detector is a vidicon.

10. A fluorescent soundtrack readout system comprising:
   (a) a film having thereon a plurality of digitally coded soundtracks comprising soundtrack images imprinted with a fluorescent material which is transparent in visible light and which emits visible light when exposed to ultraviolet light;
   (b) an ultraviolet light beam source to provide a beam of ultraviolet light;
   (c) means for moving the film past the beam of ultraviolet light;
   (d) means for directing said beam of ultraviolet light onto said soundtrack images, whereby they fluoresce;
   said means comprising:
      an ultraviolet light reflecting visible light transmitting dichroic mirror and two ultraviolet and visible light reflecting mirrors, wherein the ultraviolet light is first directed onto the dichroic mirror from which it is then directed by at least one lens onto a first totally reflecting concave mirror and then to a second totally reflecting mirror from which it is directed onto the fluorescent soundtrack, and wherein the emitted visible light is directed onto the second total reflecting mirror to the first totally reflecting concave mirror and then transmitted through the dichroic mirror;
   (e) an image detector to detect the said emitted light transmitted through the dichroic mirror; and
   (f) means for enclosing said readout system to provide a substantially dark environment except for said beam of ultravoilet light and said emitted visible light.

11. The readout system of claim 10, wherein the dichroic mirror and the second totally reflecting mirror are contained within an ultraviolet and visible light transmitting lens.

12. A fluorescent soundtrack readout system comprising:
   (a) a film having thereon a plurality of digitally coded soundtracks comprising soundtrack images imprinted with a fluorescent material which is transparent in visible light and which emits visible light when exposed to ultraviolet light;
   (b) an ultraviolet light beam source to provide a beam of ultraviolet light;
   (c) means for moving the film past the beam of ultraviolet light;
   (d) means for directing said beam of ultraviolet light onto said soundtrack images whereby they fluoresce;
   said means comprising:
      a visible light reflecting, ultraviolet light transmitting dichroic mirror and two ultraviolet and visible light reflecting mirrors, wherein the ultraviolet light is first directed by at least one lens onto a first totally reflecting mirror and then to a second totally refelcting mirror from which it is directed back to said first mirror from which it is reflected onto the fluorescent soundtrack, and wherein the emitted visible light is directed onto the first totally reflecting mirror to the second totally reflecting mirror, back to the first totally reflecting mirror and then transmitted to the dichroic mirror which reflects said visible light;
   (e) an image detector to detect the said emitted light reflected thereon from the dichroic mirror; and
   (f) means for enclosing said readout system to provide a substantially dark environment except for said beam of ultraviolet light and said emitted visibile light.

* * * * *